United States Patent [19]

Miard

[11] 4,393,470
[45] Jul. 12, 1983

[54] METHOD AND DEVICE FOR THE COUNTING AND MANAGEMENT OF ASYNCHRONOUS EVENTS EMITTED BY PERIPHERAL DEVICES IN A DATA PROCESSING SYSTEM

[75] Inventor: Pierre V. L. Miard, Noisy le Grand, France

[73] Assignee: Compagnie Internationale pour l'Informatique Cii-Honeywell Bull (Societe Anonyme), Paris, France

[21] Appl. No.: 206,726

[22] Filed: Nov. 14, 1980

[30] Foreign Application Priority Data

Nov. 19, 1979 [FR] France ................. 79 28422

[51] Int. Cl.³ ............................................. G06F 3/00
[52] U.S. Cl. ............................................. 364/200
[58] Field of Search ...................... 364/200, 900

[56] References Cited

U.S. PATENT DOCUMENTS

| | | | |
|---|---|---|---|
| 3,447,135 | 5/1969 | Calta et al. | 364/200 |
| 3,588,831 | 6/1971 | Figueros et al. | 364/200 |
| 3,699,530 | 10/1972 | Capowski et al. | 364/200 |
| 3,725,864 | 4/1973 | Clark et al. | 364/200 |
| 4,028,663 | 6/1977 | Royer et al. | 364/900 |
| 4,103,328 | 7/1978 | Dalmasso | 364/200 |
| 4,161,779 | 7/1979 | Spencer et al. | 364/200 |

OTHER PUBLICATIONS

Atkinson et al, "Modern Central Processor Architecture", *Proceedings of the IEEE*, vol. 63, No. 6, Jun. 1975, pp. 863-870.
Callahan et al, "Masking Selected Interrupts From Selected Input/Output Devices", *IBM Tech. Disclosure Bulletin*, vol. 19, No. 8, Jan. 1977, pp. 2997-2998.
Callahan et al, "Data Processor Real-Time Input/Output Channel", *IBM Tech. Disclosure Bulletin*, vol. 19, No. 8, Jan. 1977, pp. 3005-3011.

*Primary Examiner*—David H. Malzahn
*Attorney, Agent, or Firm*—Kerkam, Stowell, Kondracki & Clarke

[57] ABSTRACT

Method and device for application, counting and management of asynchronous events emanating from peripheral devices connected to a data processing system. This method enables the system to check and regulate the number of events transmitted to the logic for processing by constitution of tables and working queues managed by the firmware. This invention is applicable principally to input-output checkers associated with the computers.

18 Claims, 16 Drawing Figures

|  | OCTET 0 | OCTET 1 | OCTET 2 | OCTET 3 |
|---|---|---|---|---|
| WORD 0 | | | | |
| WORD 1 | C | P | A | A |
| WORD 2 | | | LINK OF Q/LC/CPW | |
| WORD 3 | | | | |
| WORD 4 | LINK OF Q/LC/EVQ | | EVENT TYPE | |
| WORD 5 | SENDER (PC#,LC#) | | | |
| WORD 6 | | | | |
| WORD 7 | | | | |
| WORD 8 | | | | |
| WORD 9 | | | | |
| WORD 10 | | | | |
| WORD 11 | | | | |
| WORD 12 | LINK OF Q/LC/EVQ | | EVENT TYPE | |
| WORD 13 | SENDER (PC#,LC#) | | | |
| WORD 14 | | | | |
| WORD 15 | | | | |

Words 4–7: INTERMEDIATE OR TERMINATION MESSAGE

Words 12–15: WAITING MESSAGE

FIG. 7

|  | OCTET0 | OCTET1 | OCTET2 | OCTET3 |
|---|---|---|---|---|
| WORD 0 | | | | |
| WORD 1 | | | | |
| WORD 2 | (PCLC)0 | | (PCLC)1 | |
| WORD 3 | (PCLC)2 | | (PCLC)3 | |
| WORD 4 | | | | |
| WORD 5 | | | | |
| WORD 6 | | | | |
| WORD 7 | | | | |
| WORD 8 | | MACT | | |
| WORD 9 | | | | |
| WORD 10 | | | CACT | |
| WORD 11 | | | ACOHP | |
| WORD 12 | | | | |
| WORD 13 | | | | |
| WORD 14 | | | | |
| WORD 15 | | | | |

FIG. 8

INSTRUCTION

| OP | | C | | AS | | |
|---|---|---|---|---|---|---|
| 0 | 7 | 8 | 10 11 | 15 | 23 | 31 |

OPERAND

| MASK | | MBZ | | LDN | | |
|---|---|---|---|---|---|---|
| 0 | 3 4 | 7 | 15 | 23 | | 31 |

FIG.11

INSTRUCTION LLPA

| OP | C | AS |
|---|---|---|
| 0   7 8 | 11 12   15 16 | 23 24   31 |

BUFFER MEMORY ZONE ASSOCIATED WITH
INSTRUCTION LLPA

| AS | OCTET 0 | OCTET 1 | OCTET 2 | OCTET 3 |
|---|---|---|---|---|
|  | M B Z | | L D N | |
| WORD 1 | | | | |
| WORD 2 | | | | |
| WORD 3 | | | | |
| WORD 4 | | | | |
| WORD 5 | | MACT | | |
| WORD 6 | | | | |
| WORD 7 | | | | |

FIG.14

METHOD AND DEVICE FOR THE COUNTING AND MANAGEMENT OF ASYNCHRONOUS EVENTS EMITTED BY PERIPHERAL DEVICES IN A DATA PROCESSING SYSTEM

BACKGROUND OF THE INVENTION

The present invention relates to the arrangement of a system for control and checking of the inputs and outputs of data associated with a data processing system and relates particularly to a method and an arrangement permitting an improved management of messages, sometimes termed "interrupts", emitted by the peripheral devices on the occasion of chance events occurring on the latter.

Data processing systems generally comprise a central processing system to which peripheral devices are connected. The dialogue between the central processing system and the peripheral devices is effected under the direction of a master control unit for transfer of the data inputs and outputs through what it is convenient to call channels. This master control unit for transfer of the data inputs and outputs is itself controlled by a specialized micro-logic within the machine in the form of firmware termed an Input-Output Handler (IOH), which will hereinafter be called input-output request management module. In the course of development of the logic programs, each time an input-output operation proves necessary, a logic module called a channel program is executed on a processor (specialized or unspecialized); it is this channel program which controls and checks the operation of the exchanges through the channels. The channel program once connected to the peripheral device concerned continues to execute independently of the execution of the other logic programs. The peripheral device executes to the end the orders which it will have received through the channel from the channel program.

In the course of their operation, the peripheral devices are the origin of events (interrupts) which necessitate the arbitration of the input-output request management module. These events are of two sorts. The first category, designated by EV1, is that of the TERMINATION or INTERMEDIATE events. TERMINATION events are events announcing that a channel program is terminated. INTERMEDIATE events are events announcing that a channel program has reached a well-defined intermediate stage within the channel program. The second category, designated by EV2, is that of the ATTENTION events which signal an event not linked to a channel program, for example, a change of operation occuring at the peripheral device. This is the case, for example, when an operator changes a peripheral apparatus from READY to STANDBY by pressing a push-button. The first category (EV1) comprises events known as synchronous or solicited since their existence is due to the execution of the channel program. The second category (EV2) comprises asynchronous or non-solicited events since their appearance is not the direct result of the execution of a channel program.

These events are made known to the logic by means of messages elaborated by the input-output request management module.

In a complex data processing system comprising a large number of peripheral devices, it occurred that the firmware was seized by a large number of asynchronous messages coming from one and the same peripheral device, thus masking the messages from the other peripheral devices for prohibitive time periods. The problem was therefore posed of blocking the arrival of these messages whilst avoiding losing messages.

SUMMARY OF THE INVENTION

The present invention provides a solution to this problem by proposing a method of accounting and checking asynchronous messages utilizing the technological means of the input-output master control unit as well as the firmware microprograms which control this master control unit. In this input-output master control unit, the firmware effects operations for filtering and conservation of messages which were up until then ensured by the logic; this results in a simplification of the logic, an increase in performance of the machine and the safeguarding of excess numbers of asynchronous messages which the logic was lead to abandon.

Briefly stated, and in accordance with the invention, a method for counting the number of messages emitted by the peripherals linked to a microprogrammed or analog data processing system is characterized in that, for each appearance of an asynchronous event on a peripheral device, this event is signalled to the firmware; the firmware thus solicited forms a message intended to inform the logic; then the firmware places this message in a primary waiting queue where this message waits until the moment when the logic can take this message into account; at the moment of taking it into the primary waiting queue, the firmware increases by one unit the contents of a transmitted event counter assigned to the peripheral device which has originated the asynchronous events; at the moment of taking into account by the logic, the latter requests the firmware to decrease this count.

According to another aspect of the method of the invention, before placing the message intended to inform the logic in the primary waiting queue, the firmware compares the contents of the counter assigned to the peripheral device with the contents of a boundary register containing a limit value. If the contents of this counter do not exceed the limit value, the message is placed in the primary waiting queue; if the contents of this counter exceed the limit value, the firmware places the message in a secondary waiting queue, also called the limit value overflow waiting queue.

According to another aspect of the method of the invention, the contents of the boundary register can be modified by the logic so as to introduce into it a new limit value.

According to still another aspect of the method of the invention, if, following the modification of the contents of the boundary register, the contents of the transmitted events counter becomes less than the new limit value, the firmware withdraws from the secondary waiting queue to put them in the first waiting queue, as many messages as will be necessary so that, by increasing the said transmitted events counter by one unit on each introduction of a new message into the primary queue, the content of the transmitted events counter reaches the limit value, or until there is no further message waiting in the secondary queue.

According to yet another aspect of the method of the invention, the contents of this transmitted events counter can be modified by the firmware apart from the appearance of asynchronous events.

According to another aspect of the method of the invention, if, following the modification by the firmware of the contents of the transmitted events counter, this content becomes less than the limit value, the firmware withdraws as many messages from the secondary waiting queue for placement in the primary waiting queue as will be necessary so that, by increasing by one unit the contents of the transmitted events counter on each introduction of a new message into the primary queue, the contents of the transmitted events counter reach the limit value, or until there is no waiting on the secondary queue.

The invention also envisages a microprogrammed data input-output control unit enabling counting of the number of asynchronous events transmitted to the logic, characterized in that it comprises a device for counting the asynchronous events transmitted to the logic, this counting device being activated by the firmware.

According to aother aspect of the invention, the counting device comprises counters situated in the firmware operating tables.

It will also be appreciated that the invention extends to data or analog processing systems similarly equipped with an input-output control unit according to any of the preceding features.

BRIEF DESCRIPTION OF THE DRAWINGS

The invention will now be described, by way of example, with reference to the accompanying drawings, which represent preferred embodiments of the invention, and in which:

FIG. 7 represents the configuration of an LCE entry of a Logic Channel Table LCT;

FIG. 8 represents the configuration of an LDE element of Logic Device Table LPT relating to the peripheral devices;

FIG. 11 represents the format of a CSCT instruction and is associated operand;

FIG. 14 represents the format of an instruction LLPA and of the associated buffer memory zone.

DETAILED DESCRIPTION OF THE PREFERRED EMBODIMENTS

Figure 1:
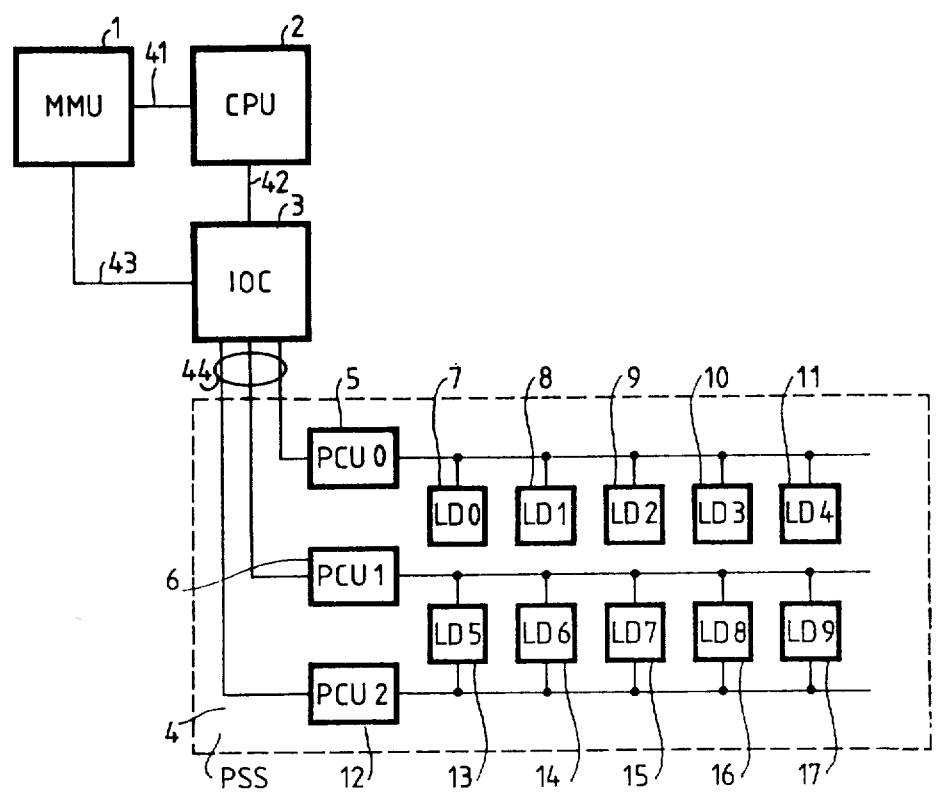
FIG. 1 represents, in the form of a block diagram, a data processing system utilizing the teachings of the invention.

FIG. 1 represents a data processing system incorporating the present invention. This system comprises:
(1) a Main Memory Unit (MMU) 1;
(2) a Central Processing Unit (CPU) 2;
(3) an Input-Output Controller (IOC) 3 for the transfer of input and output data;
(4) a Peripheral Subsystem (PSS) 4 for data input and output comprising Peripheral Control Units (PCU's) 5, 6 and 12 and peripheral devices termed Logical Devices (LD's) 7, 8, 9, 10, 11, 13, 14, 15, 16 and 17.

These various elements CPU, MMU, IOC and PSS are interconnected by buses which are for convenience shown in single-wire form at 41, 42, 43 and 44.

The present invention relates more particularly to the Input Output Controller (IOC) 3. The IOC 3 serves as an intermediary for controlling and checking the exchanges carried out between the Peripheral Subsystem PSS 4 and, on the one hand, the main memory MMU 1 and, on the other hand, the central processing unit CPU 2.

The data processing system thus described is similar to the data processing systems described adequately in the technical literature such as, for example, the following works:

"Microprogramming Principles and Practices" by Samir HUSSON (1970 Prentice Hall); and "Computer Organization and Microprogramming" by YAO-YAOHAN CHOU (1972 Prentice Hall).

Particular embodiments of data input-output control and checking systems according to the prior art are described in commonly-assigned French Pat. No. 2,283,003 (corresponding to U.S. patent application Ser. No 625,665, filed Oct. 24, 1975, by Antoine et al, now abandoned, continuation application Ser. No. 161,508 filed June 20, 1980) and commonly-assigned French Pat. No. 2,260,140 (corresponding to Bienvenu U.S. Pat. No. 4,060,849, issued Nov. 29, 1977).

The data processing subsystem is microprogrammed. By this it should be understood that its operation is controlled and checked by means of micro-instructions belonging to the microprograms. A microprogram which controls the execution of the individual operations necessary for the execution of the corresponding instruction corresponds to each instruction of the subsystem. All the microprograms belong to what it is convenient to call the firmware. The firmware also comprises a certain number of tables serving to record the addresses and parameters necessary for the development of the microprograms.

The most frequently used part of the firmware is stored in one or more specialized memories of the unalterable memory type "Read Only Storage" (ROS) and/or of the alterable memory type "Writable Control Storage" (WCS). These specialized memory or memories are subsequently designated by "Control Store Unit" (CSU) which is that which has been given it by the devisers of the data processing system. The rest of the firmware is stored in a reserved zone of the main memory unit MMU. This reserved zone is inaccessible by the utilizing programs.

The unalterable memory CSU is exploited by a Read Only Storage Control Unit (RCU) unit for putting the firmware into operation. The unit RCU for putting the firmware into effect extracts, only as needed, the microinstructions from the memory CSU or from the reserved memory zone according to case, decodifies these microinstructions and, from the result of the decodifications, orders the operation of the rest of the machine.

The specialized memory CSU and the unit for putting the firmware into operation are not shown in FIG. 1.

In FIG. 1 is shown a central processing unit CPU 2, this central processing unit 2 comprising a multiplicity of processors working concurrently. These processors execute operations which can be processed at the same time, that is to say that their executions are independent of each other. Of course these processors enter into competition for the utilization of the data processing system resources. Their conflicts for access to the resources are judged by the firmware with the help of a number of registers and priority management circuits.

Figure 2:
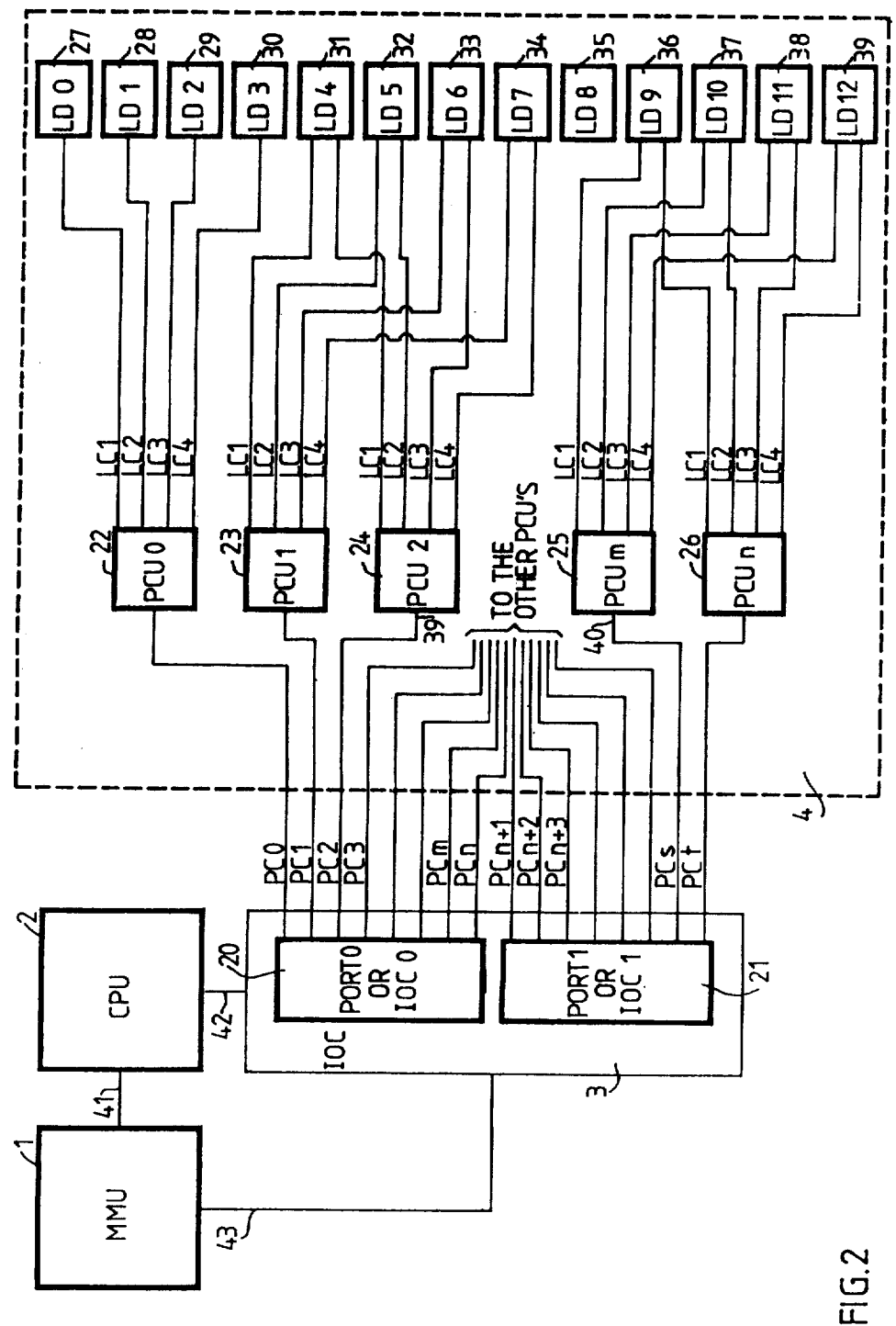
FIG. 2 represents the preceding data processing system in which are indicated the paths of the data connecting the peripheral devices to the input-output control unit.

FIG. 2 shows in detail the method of connection of the Input Output Controller unit IOC 3 with the Peripheral Control Units PCU0 22, PUC1 23, PCU2 24, . . . PCUm 25 and PCUn 26 with the peripheral devices (Logical Devices) LD0 27, LD1 28 . . . LD12 39 which they serve. These details are furnished because they permit comprehension of how the logic designates a peripheral device LD, which it wishes to attain, by means of an address which can be either the defintion of the path followed by the data between the IOC and the peripheral device LD or the definition of the peripheral device itself by its name LD followed by the number of this device. The examples which follow illustrate these modes of addressing.

In FIG. 2 it may be seen that the Input Output Controller IOC 3 comprises two data input and output coupling units PORT0 20 and PORT1 21, which will also be designated hereinafter respectively as IOC0) and IOC1. These two coupling units IOC0 20 and IOC1 21 are connected as indicated in FIG. 2 to different control units of the peripheral apparatus PCU0 22, PCU1 23, PCU2 24 . . . PCUm 25 and PCUn 26 by connections called physical channels; each physical channel serves a single Peripheral Control Unit. To each physical channel corresponds a number which is that of the rank of the terminal of the data input and ouput coupling unit to which it is attached. In this way, by indicating the references of the rank of the terminal of the coupling unit serving a physical channel, this latter is defined. It is usual to designate a physical channel by the address PC# where the symbol "#" represents the rank of the terminal of the coupling unit for PC.

Each of the Peripheral Control Units PCU0 22, PCU1 23, PCU2 24 . . . PCUm 25 and PCUn 26 has the purpose of controlling and checking the operation of a group of peripheral devices. Often, furthermore, the peripheral devices are grouped in families: e.g., the magnetic disc family, the magnetic tape family, the slow peripheral device family. A particular type of Peripheral Control Unit corresponds to each peripheral device family. A certain number of peripheral devices are therefore associated with each of the Peripheral Control Units. Each of these peripheral devices is connected to the Peripheral Control Unit on which it depends through a logic addressing device called a Logic Channel (LC). To each Logic Channel is attributed, within the family to which it belongs, a serial number and this Logic Channel is designated by the abbreviation LC followed by the serial number which is attributed to it. It is to be noted that the logic channel LC0 is reserved for exchange data concerning exclusively Peripheral Control Unit PCU.

It will be seen from the preceeding that in order to designate a peripheral device, the Central Processing Unit 2 has only to define the number of the Physical Channel PC# and the number of the Logic Channel LC#.

Furthermore, as will be seen hereinafter, it happens that peripheral devices are connected to several physical and logic channels or even that they serve several central processing units. For this reason it is necessary to give a reference to each peripheral device; for this purpose each peripheral device is allocated a different number from that allocated to the other peripheral devices. This is sufficient to distinguish it and it will be designated by the abbreviation LD (Logical Device), followed by the number allocated.

The existence of multiple access on one and the same peripheral device is shown in FIG. 2.

In effect, by examining the connections leading to the peripheral devices LD4 31, LD5 32, LD6 33 and LD7 34, it will be seen that two connections occur per peripheral device LD. Also the peripheral device LD5 32 receives the connection LC2 coming from the Peripheral Control Unit PCU1 23 and the connection LC2 coming from the Peripheral Control Unit PCU2 24. This means that it is possible for two different Peripheral Control Units PCU's to access a single peripheral device LD; i.e., the peripheral device possesses a double access.

Figure 3:
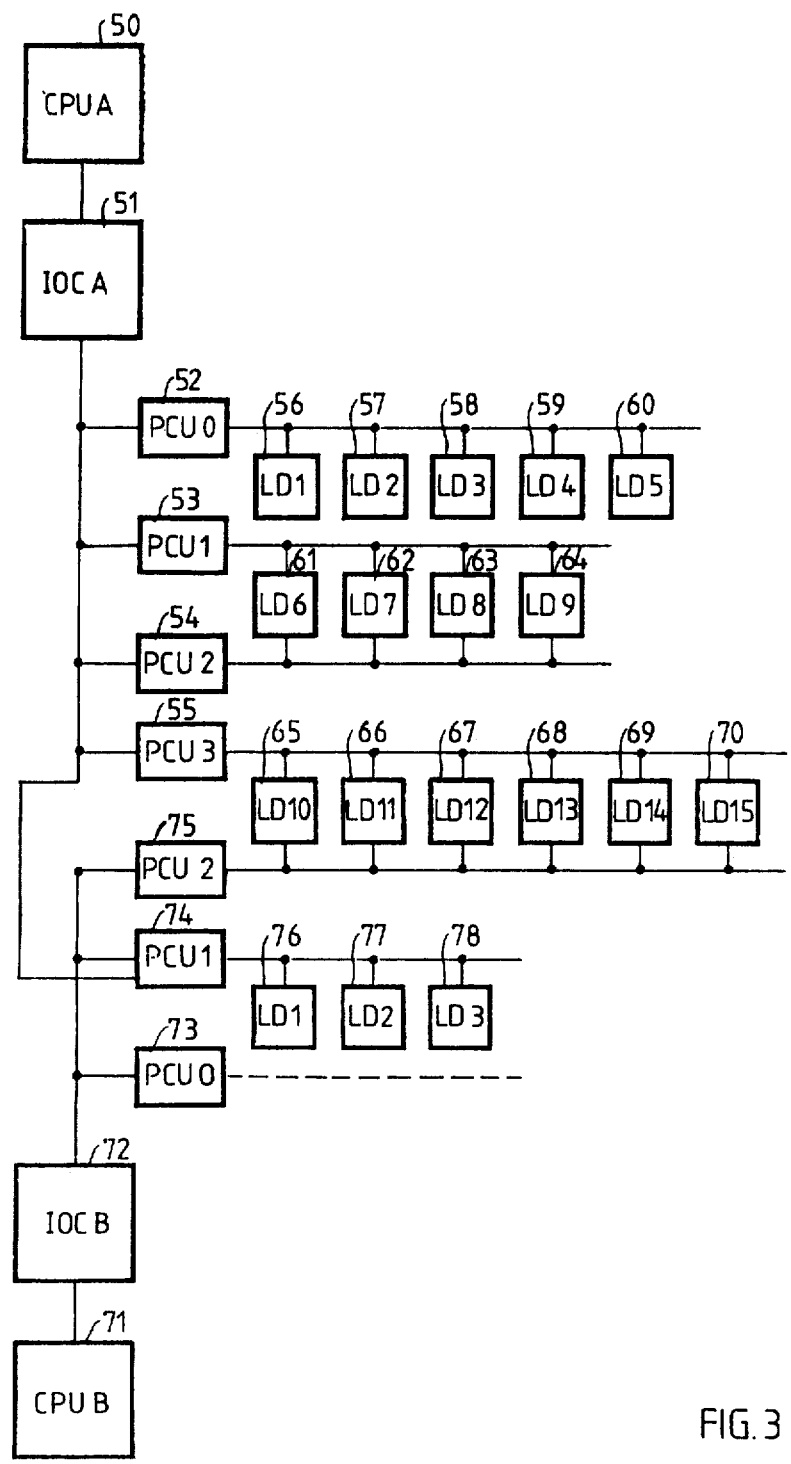
FIG. 3 represents, in the form of a block diagram, the data paths connecting the peripheral devices to the input-output control units separately servicing two central processing units.

This double access possibly can be used to reach a peripheral device LD from two central processing units CPU as is shown in FIG. 3. In this figure are represented two central processors CPU A 50 and CPU B 71. To each of them is associated a data Input-Output Controller, respectively designated by IOC A 51 and IOC B 72. The IOC A 51 is connected to four Peripheral Control Units designated PCU0 52, PCU1 53, PCU2 54 and PCU3 55. The IOC B 72 is connected to three Peripheral Control Units designated by PCU0 73, PCU1 74 and PCU2 75.

The Peripheral Control Unit PCU3 55 which is connected to the Input/Output Controller IOC0 51 is connected to the peripheral devices LD10 65, LD11 66, LD12 67, LD13 68, LD14 69 and LD15 70. These peripheral devices are also connected to the Peripheral Control Unit PCU2 75, which is itself connected to the Input-Output Controller IOC1 72. It is the existence of peripheral devices having multiple access in a data processing system which necessitates having a system for direct addressing of the peripheral device by its address LD#. In effect, when a peripheral device has a multiple access, the data processing system has the possibility of selecting a data path from amongst a multitude of data courses for access to this peripheral device. This possibility of choice is very interesting for the data processing system because if a data path is not free or not available the system can try to borrow another data path.

To clarify what has just been said, the two modes of address of peripheral apparatus in a data processing system are examined below:

In the first addressing mode, which is called a restricted address mode, the peripheral device LD is addressed by defining the path followed by the data in the course of exchanges between the data Input-Output IOC and the peripheral device to be addressed. This Data Path (DP) is defined by the number of the physical channel, preceded by the letters PC, and then by the number of the logic channel, preceded by the letters LC. In what follows the Data Path (DP) is designated by PC# and LC#, the "#" indicating that it is a matter of the attributed number.

In the second addressing mode which is the extended addressing mode, the peripheral device is designated directly by its name, i.e., its number preceded by the letters LD. In this case the address will be designated by LD#.

It will be seen further, on examination of the channel programs, how these two address modes are used.

The operation of the data processing system is ensured by a set of logic programs. These include Channel Programs (CP's) especially for the control and checking of data input and output operations. A Channel Program in the course of its execution uses only a single channel.

A channel program CP comprises two parts; a heading and a body. The heading comprises a fixed number of words which contain service parameters concerning the execution of the channel program. In the preferred embodiment of the invention there are two types of channel programs: channel programs of the 0 type and channel programs of the ≠0 type. The difference between these two types of channel programs resides in the mode of addressing the peripheral device LD.

The channel programs of the 0 type utilize the restrained addressing mode, i.e., the peripheral device addressed is defined by the path which will be followed by the data during the development of the channel program. This path, as mentioned above, is called the Data Path and is designated by the abbreviation DP. This path is defined by the physical channel number PC and the logic channel number LC. It is usual to symbolically designate this data path DP by the notation PC#, LC#, where PC# designates the physical channel number and LC# the logic channel number.

Figure 4:
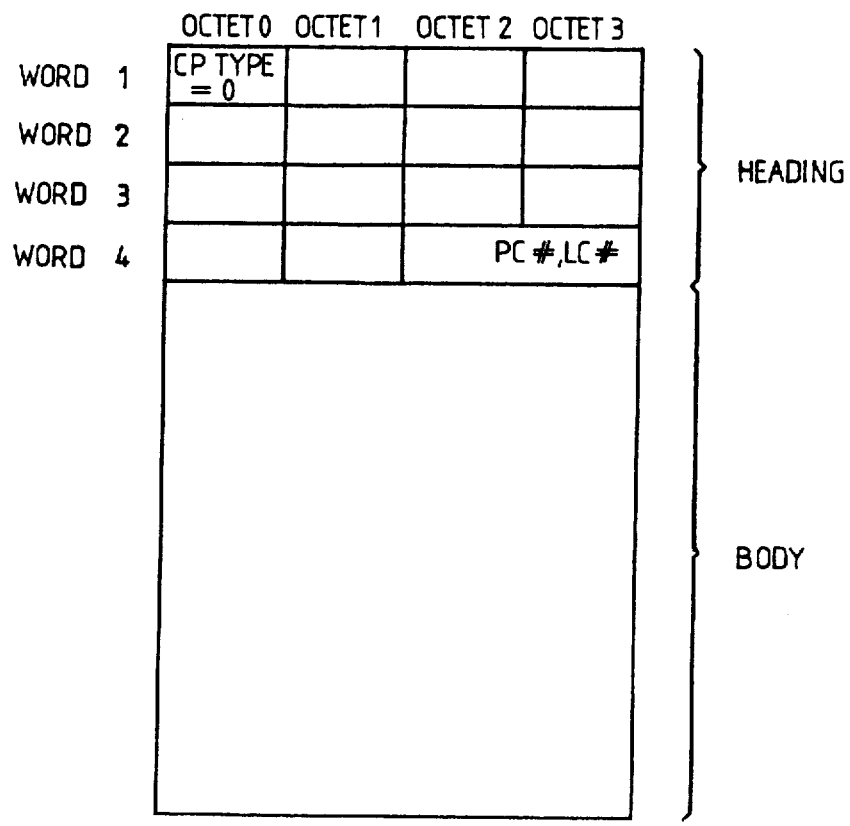
FIG. 4 represents the configuration of a channel program of 0 type.

FIG. 4 represents a channel program of the 0 type. The words composing the channel program each have a length of four octets, designated from left to right by: OCTET 0, OCTET 1, OCTET 2, and OCTET 3. The heading of the channel program of the 0 type has a fixed length of four words designated from top to bottom by: WORD 0, WORD 1, WORD 2, and WORD 3. Only the parameters necessary for the understanding of the present invention are shown in FIG. 4. The OCTET 0 of WORD 0 contains a nil number: this nil number indicates that the channel progrm is of the 0 type. The OCTETS 2 and 3 of th WORD 3 contain the definition of the data path DP in the form of three numbers: the physical channel number PC# and the logic channel number LC#.

After the heading comes the body of the channel program which contains a succession of Channel Control Entry (CCE) blocks. It is these CCE blocks which serve to control the execution of the operations which are the object of the channel program.

Figure 5:
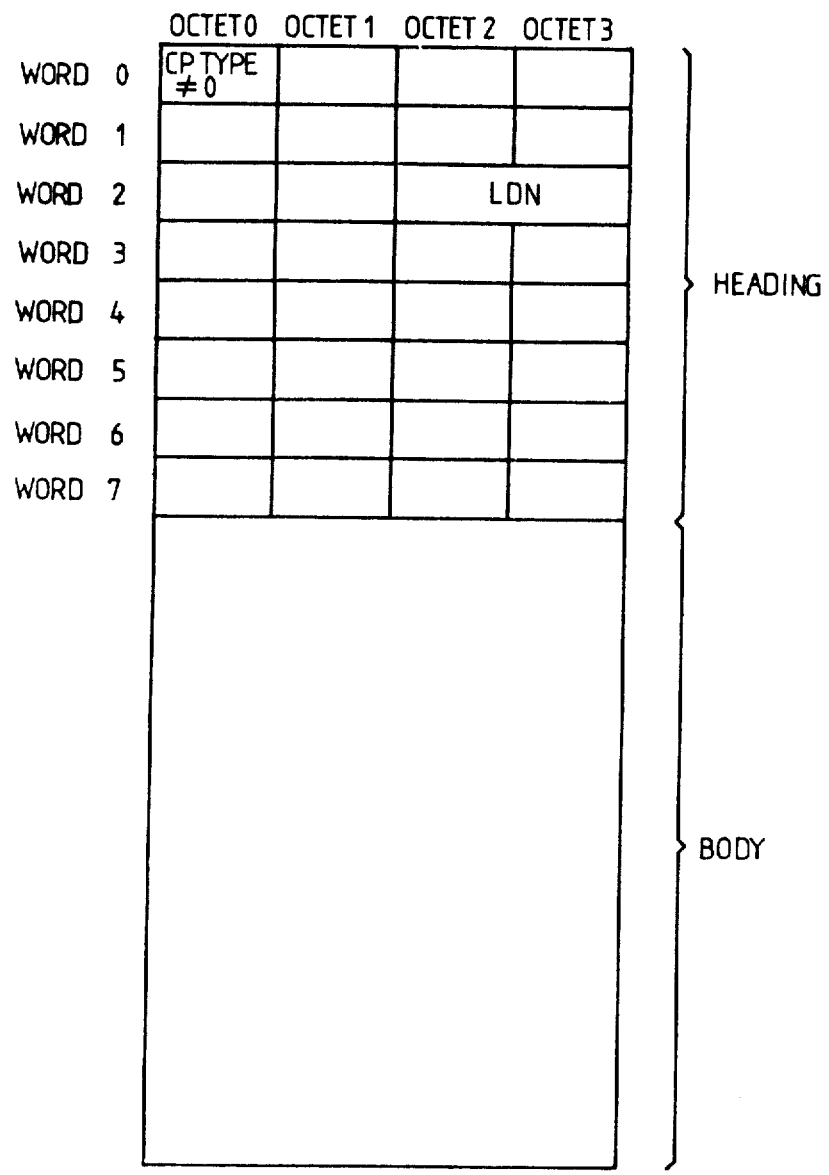
FIG. 5 represents the configuration of a channel program of ≠0 type.

FIG. 5 represents a channel program of the ≠0 type utilizing the extended addressing mode, i.e., the peripheral device LD concerned is designated by a number designating it directly. This number is usually 1 represented by the symbol LD#.

In FIG. 5, the heading of the channel program of the type ≠0 has a fixed length of eight words designated by WORD 0 through WORD 7. The OCTET 0 of the WORD 0 contains the channel program type number designated by CP TYPE. This channel program type number is, therefore, in this case, not equal to zero. The OCTETS 2 and 3 of the WORD 2 contain the Logical Device Number (LDN) designating the particular peripheral device concerned by its reference LD#.

The Channel Program is of the same type as the channel programs of 0 type.

The channel programs are incorporated into the data processing programs according to the needs of these programs. When, in the course of development of a program a data input-output operation application occurs, it is translated by execution of a peripheral device connection instruction SIO or CONNECT. This instruction comprises an operand which gives the stored address of the origin of the channel program to be executed. The execution of this instruction SIO or CONNECT releases a cycle of operations intended to position the input-output operation. After identification of the peripheral device concerned by reading its address in the heading of the channel program, a demand for utilization of this peripheral is made to the firmware module which controls the requests. As a result this module is designated by the name of input-output request management module.

To manage the peripheral device utilization demands which are made to it, the management module utilizes tables in which the parameters necessary for the execution of the channel programs are stored. These tables are called Input-Output Control Tables (IOCT). There are three of such tables:

(1) Physical Channel Tables PCT 0 and PCT 1 for indicating channel activity. There is a table PCT for each coupling unit or PORT: the table PCT 0 corresponds to a coupling unit PORT 0, and table PCT 1 corresponds to a coupling unit PORT 1.

(2) Logic Channel Tables (LCT) for indicating the state of a logic channel or a service demand. There is an LCT table for each physical channel.

(3) An Logical Device Table (LDT) for designating the state of each peripheral device.

A Physical Channel Table PCT comprises entries each termed a Physical Channel Entry (PCE). The table PCT has as many entries as there are physical channels.

These entries PCE are arranged in the table in the order of the physical channel numbers to which they are attached. For example, the first PCE entry of the table PCT is that corresponding to physical channel of rank zero, i.e. PC 0. This entry is designated PCE 0. The following entry in the table, designated PCE 1, is that corresponding to the physical channel of row 1, that is PC1. And so on until all the physical channels have a corresponding element. This disposition favors searching for elements. Thus the origin address and the unit length of the elements being known, it is easy to find the starting address of the entries PCE with the sole condition of knowing furthermore the channel number to which it is attached.

Figure 6:
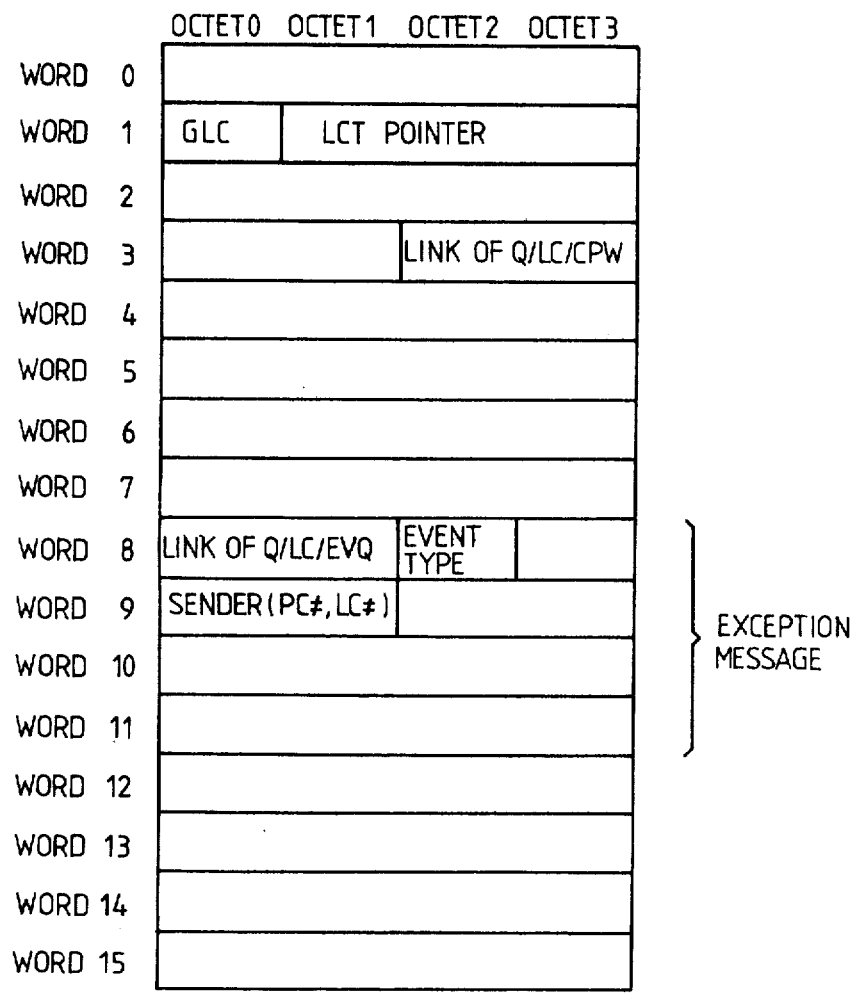
FIG. 6 represents the configuration of a PCE entry of a Physical Channel Table PCT.

FIG. 6 represents a single entry PCE. Each entry PCE comprises sixteen words referenced WORD 0 through WORD 15, each word having a length of four octets. Only the parameters necessary for understanding the present invention are shown for this entry. The OCTET 0 of the WORD 1 is for the Greatest Logical Channel (GLC) and represents the maximum number of the logic channel LC# served by the physical channel to which is attached this entry PCE. The OCTETS 1, 2 and 3 of WORD 1 contain a pointer which gives the start address of the table LCT corresponding to the physical channel to which is attached the entry PCE. The OCTETS 2 and 3 of the WORD 3 contain a pointer LINK OF Q/LC/CPW, (Link of Queue/Logical Channel/Event Queue). This pointer is directed towards a one containing the address of the first channel program to be executed in the channel programs waiting queue Q/LC/CPW.

The WORDS 8, 9, 10 and 11 constitute a zone reserved for exception messages. When an incident occurs on a peripheral device connected to a logic channel served by the physical channel corresponding to the entry PCE, parameters relative to the incident are registered in this zone. The OCTETS 0 and 1 of WORD 8 contain the address of the event following the waiting queue of the events designated by LINK of Q/LC/EVQ. It will be seen further on how this waiting queue is constituted. The OCTET 2 of the WORD 8 contains a number which defines the type of event (EVENT TYPE) which is the object of this first event in the waiting queue Q/LC/EVQ. The OCTETS 0 and 1 of the WORD 9 contain the address of the peripheral device which was the origin of this event designated by SENDER (PC#, LC#). This address is furnished in the form of the physical channel number PC# and the logic channel number LC#.

It has been seen that the OCTETS 1, 2 and 3 of WORD 1 of an entry PCE corresponding to a physical channel PC# contain a number which is a pointer LCT POINTER, this latter pointing towards the origin of a table LCT which contains the logic channels service parameters depending on this physical channel.

An LCT table comprises a plurality of entries LCE placed one after the other. There are at least as many entries LCE as there are logic channels served by the physical channel corresponding to the PCE which points to this table LCT. The LCE entries are placed in ascending order of logic channel numbers LC#. Thus the first element corresponds to the logic channel of row 0 i.e. LCO. It is to be noted that the Logic Channel 0 in the embodiment of the invention is reserved for addressing the peripheral controller PCU connected to the physical channel PC concerned. Each element LCE is composed of sixteen words of four octets.

In FIG. 7 is shown an element LCE of the state table logic channels LCT. In this figure only the parameters necessary for understanding of the resent invention are represented.

The WORD 1 contains the address where the channel program is to be found in the main memory. This address is reference CPAA (Channel Program Absolute Address). This address CPAA is written in this place by the request management module on request for starting the input-output operation. CPAA is the address of origin of the channel program being presented as a candidate for utilization of the logic channel.

The OCTETS 2 and 3 of WORD 2 contain a link which enables constitution of the waiting queue for channel programs waiting execution. This waiting queue is designated Q/LC/CPW (Queue/Logical Channel/Channel Program Waiting). The link is designated by LINK of Q/LC/CPW. By link is understood the designation of the next LCE of the waiting queue by references PC#, LC#.

The WORDS 4, 5, 6 and 7 serve to store the parameters concerning the INTERMEDIATE events or the TERMINATION events. These events are events linked to the development of a channel program. An INTERMEDIATE event comprises the arrival at a Channel Control Entry block CCE specifying that it is necessary to warn the logic of its arrival for execution.

A TERMINATE event comprises the execution of the last control block CCE of a channel program. This event signifies to the logic that the channel program development is terminated. The OCTETS 0 and 1 or WORD 4 contain a link which enables constitution of the waiting queue Q/LC/EVQ (Queue/Logical Channel/Event Queue) of the waiting events. The OCTET 2 of the WORD 4 contains a number which defines the type of event which follows in the waiting queue Q/LC/EVQ. In effect, it will be seen further on that there are three types of events and how the waiting queues of events in suspense are constituted. The OCTETS 0 and 1 of WORD 5 contain the address in the form of PCE#, LC# of the peripheral device LD where the event consigned to this entry LCE takes place.

The WORDS 12, 13, 14 and 14 are reserved for storing the parameters concerning the ATTENTION events. The ATTENTION events are events occurring at the level of the peripheral device LC without being the result of the development of a channel program. This is the case, for example when an operator by operating a pushbutton changes the operational state of a peripheral device.

The OCTETS 0 and 1 of WORD 12, contain a link which enables constitution of the waiting queue Q/LC/EVQ of the waiting events.

The OCTET 2 of WORD 12 contains a number which defines the type of event consigned to the element LCE which follows the present LCE in the waiting queue Q/LC/EVQ. This precision is important since, as has been seen previously, the events are not noted at the same location depending on if it was a matter of an INTERMEDIATE or TERMINATION event or an ATTENTION event. It is therefore necessary for the firmware to know the nature of the event which follows in the waiting queue.

OCTETS 0 and 1 of WORD 13 contain the address in the form PC#, LC# of the peripheral device which has been the origin of the event consigned in the present LCE.

There is another table concerning the peripherals, this is the Logical Device Table LDT. This table LDT comprises entries LDE. There are as many entries LDE as there are peripheral devices. The entries LDE are placed one after another in the order of Logic Device Numbers LDN attributed to the peripheral devices to which they are attached. In this way, knowing the LDN of a peripheral device, the utilization system can easily find the entry LDE concerning it.

Each entry LDE comprises sixteen words of four octets each. In FIG. 8 an entry LDE is shown. Only the parameters necessary for understanding of the present invention are shown in this figure.

The OCTET 2 of WORD 10 contains the number of ATTENTION events which have been transmitted to the logic by the exploitation system. This number is designated by CACT (Current Attention Count). This number represents the total sum of ATTENTION events which, having been taken from the waiting queues Q/LC/EVQ by the exploitation system, have been communicated to the logic with a view to their processing; each communication of an event increases this number by one unit. The exploitation system has at its disposal, as will be seen further on, an instruction enabling it to modify this number CACT.

The OCTET 1 of the WORD 8 contains the maximum number of ATTENTION events which it is allowed to transmit to the logic. This number is designated by MACT (Maximum Attention Count). When the transmitted number of events CACT is equal to the maximum allowed number MACT, the system can no longer transmit any ATTENTION message to the logic. The exploitation system has at its disposal, as will be seen further on, an instruction enabling it to modify this number MACT.

This disposition enables the exploitation system to limit the number of interventions due to ATTENTION messages coming from a peripheral device. This is indispensable in the multiprocessor system where ATTENTION messages can occur in high numbers. This also enables momentary suspension, in critical phases of exploitation, of the processing of ATTENTION messages coming from certain peripherals by rendering the maximum number MACT equal to zero.

The WORDS 2 and 3 contain four locations in which can be placed four addresses: (PCLC) 0, (PCLC) 1, (PCLC) 2, and (PCLC) 3. A variable number between one and four of these locations can be filled. Each address (PCLC) corresponds to a definition of the data path in the form PC#, LC#. The number of locations containing a definition of the data path (PCLC) represents the number of possible accesses for the peripheral device LD corresponding to the entry LDE. That is to say that in an entry LDE represented in FIG. 8 there is a possibility of having four accesses for the peripheral device LD if the four locations comprise respectively four different addresses.

The OCTETS 2 and 3 of WORD 11 contain a link ACOHP (Attention Count Overflow Head Pointer) permitting constitution of a waiting line Q/LC/ACO (Queue/Logical Channel/Attention Count Overflow) of the ATTENTION events which have not been taken into account by the exploitation system because the transmitted event counts CACT were equal to or greater than the upper limit MACT. The waiting queue Q/LC/ACO will be seen further on.

Figure 9:
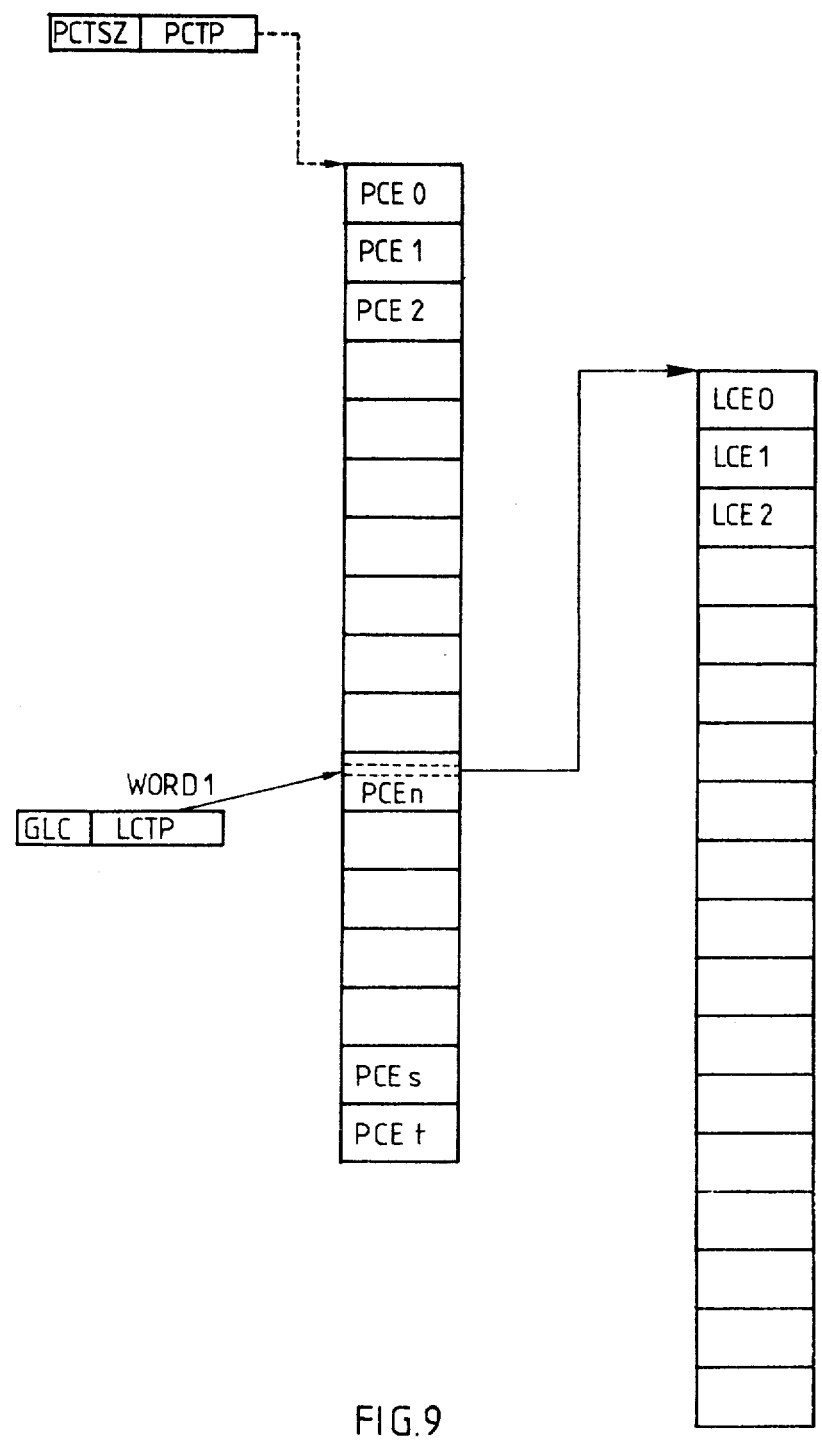
FIG. 9 is a schematic representation of the address mode of the LCT tables and of the physical channel occupation mode and of the logic channel state tables LCT.

In FIG. 9 is shown the activity table of the physical channels PCT and the logic channel state table LCT.

It has been seen that there is a Physical Channel Table PCT. So as to be able to find the table PCT, the firmware has one register. This register comprises two parts: a number PCTSZ (Physical Channel Table Size), which gives the entry number PCE contained in the table PCT; and a pointer PCTP which gives the address of the start of the table PCT.

Knowing the physical channel number PC#, the firmware can find the entry PCE corresponding to the data path DP searched. In the WORD 1 of this entry PCE are, on the one hand, a pointer LCTP which points to the start of the Logic Channels status Table LCT served by the physical channel PC# and, on the other hand, the maximum number of logic channels included in the table LCT.

The table LCT being localized, the entry LCE# sought for is the location corresponding to the logic channel number LC#.

Figure 10:
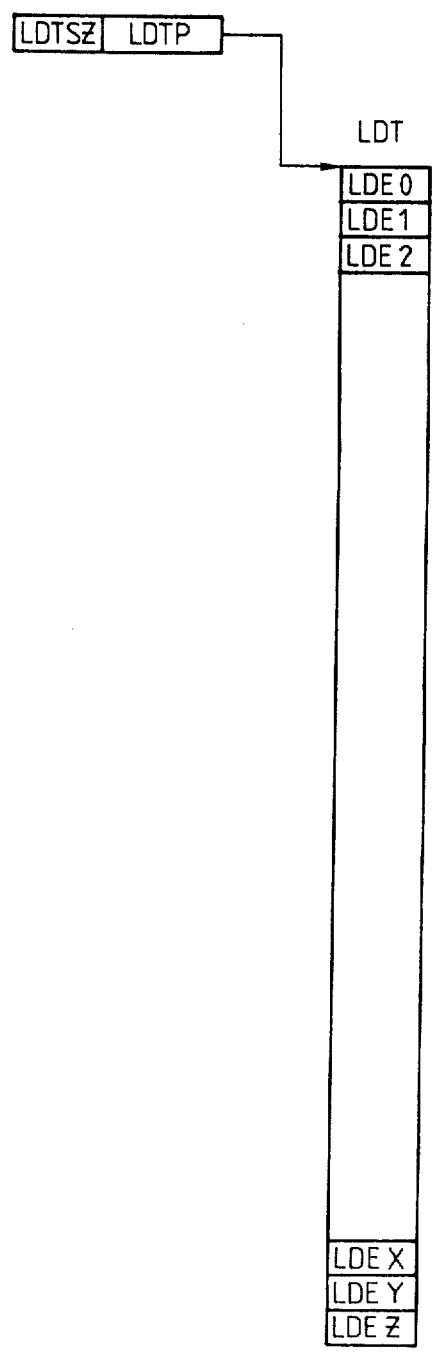
FIG. 10 is a schematic representation of the mode of addressing the peripherals state table LDT.

In FIG. 10 is represented the peripheral device state table Logical Device Table LDT. To localize this table, the firmware has a register wherein are recorded on the one hand, the size of the table LDTSZ (LDT size) and, on the other hand, a pointer LDTP (LDT Pointer) aimed at the origin of the table. In this table LDT, the elements are arranged in order of the peripheral device numbers LD#.

The tables which have just been described serve the firmware by exploiting the peripheral device. In particular the input-output request management module makes use of these tables to constitute the waiting queues necessary for accomplishment of the functions which it has to fulfill.

The present invention relates to the management of the ATTENTION events. These events are also called ASYNCHRONOUS events to remind one of the fact that their appearance is not connected to the development of a channel program and is, therefore, not synchronous with this development. Such an event can be occasioned either by a deliberate or non-deliberate action of the operator or by a fortuitous event occurring at a peripheral device served by the channel.

In fact there are three types of events capable of causing the operation of the peripheral device of a data processing system. They are designated by the labels EV 1, EV 2 and EV 3 (abbreviation of EVENT of type 1, EVENT of type 2, EVENT of type 3).

The events of the first type, designated by EV 1, are events which have already been discussed: the TERMINATION events and INTERMEDIATE events. These events are SYNCHRONOUS events since their appearance is related to the operation of well defined control blocks CCE of the channel programs.

The events of the second type, designated by EV 2, are ATTENTION events. These are asynchronous events and result from phenomena occurring at the level of the peripheral device LD. By asynchronous events should be understood events not linked with the operation of a control block CCE.

The events of the third type designated by EV 3 are events arising at the level of the physical and logic channels. These are considered as a failure at the level of the connection between the peripheral device and the central processor. They undergo a special treatment at the level of the system which considers them as attributable to the operation of the central sub-system. They do not concern the present invention and will thus not be further discussed.

It has been seen that the events of type 1 (EV 1) and the events of type 2 (EV 2) are events which occur at the level of the peripheral device LD. On appearance of an event of type 1 (EV 1) or of type 2 (EV 2), the peripheral device LD which originates the event informs the firmware of it. The firmware, thus alerted, tries to inform the logic of the presence of the event or events. If the logic cannot receive this information, the firmware constitutes a signalled events waiting queue. This waiting queue is designated by Q/M/S (Queue of Messages waiting on semaphore S).

To constitute this waiting queue Q/M/S, the firmware utilizes the Logic Channels state Table LCT. It has been seen during the description of this table, as has been illustrated in FIG. 7, that the entries LCE of this table comprises zones reserved for INTERMEDIATE or TERMINATION events which are events of type 1 (EV 1) as well as for ATTENTION events which are events of type 2 (EV 2). WORDS 4, 5, 6 and 7 are reserved for events of type 1 and WORDS 12, 13, 14 and 15 are reserved for events of type 2. When an event occurs in a peripheral device LD, this device lets the firmware know of the existence of this event and, for identification, uses the logic path DP defined by its address PC#, LC#, in the SENDER zone: the entries LCE corresponding to the logic channel number LC# used for the transmission of the message; this registration is made in OCTETS 0 and 1 of WORD 5 if it is an event of type 1 or in OCTETS 0 and 1 of WORD 13 if it is an event of type 2.

Definition of the type of event is necessary because, as it has been seen, depending on the type of incident, the references are recorded in different locations of the entry LCE (WORD 5 for events of type 1 and WORD 13 for events of type 2).

While the event messages are transmitted to the logic the waiting queue Q/M/S is updated by the firmware which causes the waiting queue Q/M/S to progress.

In the data processing system which is the subject of the present invention, the firmware takes on the counting of the ATTENTION events transmitted to the logic. For this the firmware has at its disposal a counter peripheral device. The content of this counter is incremented by one unit each time an ATTENTION message is transmitted to the logic. As there is one counter peripheral device, it is logical to place this counter in the peripheral device state table LDT.

In FIG. 8, where an entry LDE of the state table LDT is shown, the OCTET 2 of the WORD 10 is utilized as a counter; this counter is designated by CACT (Current Attention Count). It is the content of this counter CACT which is incremented by one unit each time an ATTENTION message emitted by the peripheral device LC corresponding to the entry LDE is transmitted to the logic.

It has been seen that these ATTENTION events are not connected to the execution of a channel program and it is for this reason they are called asynchronous events. Their appearance and processing by the firmware disturb the development of the operation of the data processing system where they are not always desirable; also the data processing system has at its disposal a means for protection in the form of a limitation of the number of ATTENTION events transmittable to the logic. This maximum limit is defined by the logic and is defined by the contents of the OCTET 1 of the WORD 8 of the entry LDE. This limit is designated by MACT (Maximum Attention Count) in FIG. 8.

When, in the course of execution in a data processing system, the number of ATTENTION events emitted by a peripheral or peripherals reach the maximum limits MACT defined in entries LDE corresponding to their address LD#, the firmware stops placing the ATTENTION messages in the message queue towards the logic Q/M/S. So as not to lose track of these messages thus turned back, the firmware places these overflow messages in waiting queues for messages exceeding the maximum count. These queues are designated by Q/LC/ACO (Queue/Logical Channel/Attention Count Overflow). There is one waiting queue Q/LC/ACO peripheral unit LD#.

The origin of each waiting queue Q/LC/ACO is defined in a register situated in the entry LDE corresponding to the peripheral device to which the queue Q/LC/ACO is attached. This origin is designated by ACOHP (Attention Count Overflow Head Pointer). This pointer ACOHP is to be found in OCTETS 2 and 3 of WORD 11 of the LCE as will be seen in FIG. 8. This pointer designates, in the form of an address PC#, LC#, the entry LCE of the logic channels state table LCT which contains the first ATTENTION message of the waiting queue Q/LC/ACO attached to the peripheral to which the entry LDE corresponds. This waiting queue Q/LC/ACO is constituted in the same manner as the other waiting queues by placing links which connect the messages of the queue together in the order in which they should be processed.

It is to be noted that if, at a given moment, the count CACT becomes less than the limit MACT, the software takes messages from the queue Q/LC/ACO to place them in the event queue Q/LC/EVQ.

It has just been seen the firmware counts in a counter CACT the ATTENTION events at the level of each peripheral device being at the origin of the ATTENTION events. It has also been seen that, for each peripheral device, there was a limit MACT from which the ATTENTION events are no longer admitted to the waiting queues Q/M/S but were placed in waiting queues Q/LC/ACO.

It has been seen that this description permits the firmware to protect the logic against an EXCESSIVE ATTENTION call number. However, at a given moment, the firmware may wish to change the situation. In particular the logic may wish to authorize again the transmission of ATTENTION messages for a peripheral device which is in an overflow situation. To do this the logic has at its disposal two instructions: instruction CSCT (Change State Count) which enables it to vary the counter CACT and the instruction LLPA (Load Logical Parameter) which enables it to modify the limit MACT.

Thanks to these two instructions CSCE and LLPA, the logic can modify the ATTENTION messages situation. The logic can, for example, unlock ATTENTION messages by making the count CACT less than the limit MACT and doing this by reducing the count CACT or by increasing the limit MACT. The firmware can, on the other hand, stop transmission of ATTENTION messages, for certain peripheral devices by, for example, taking the limit MACT to the zero value.

FIG. 11 represents the format of an instruction CSCT. This instruction comprises two parts: the instruction itself and an operand associated with the instruction.

The instruction of the CSCT has a word length of 32 bits distributed as follows:
  bits 0 to 7 represent the operation code OP;
  bits 8 to 10 represent the complementary code C; and
  bits 11 to 31 represent the address syllable AS, which is a pointer aimed at the first octet of the operand associated with this instruction.

The operand also has a length of 32 bits, distributed as follows:
  bits 0 to 3 represent a mask MASK;
  bits 4 to 15 must be zero (MBZ); and
  bits 16 to 31 represent the address LDN (Logical Device Number) of the peripheral device concerned.

The mask MASK is necessitated by the fact that the instruction CSCT can be used to modify several counters which one may desire to alter as well as the direction of alteration. For example, to decrement the contents of the counter CACT, the bits 0 and 1 should both have the value binary "1". Bits 2 and 3 relate to another counter.

Figure 12:
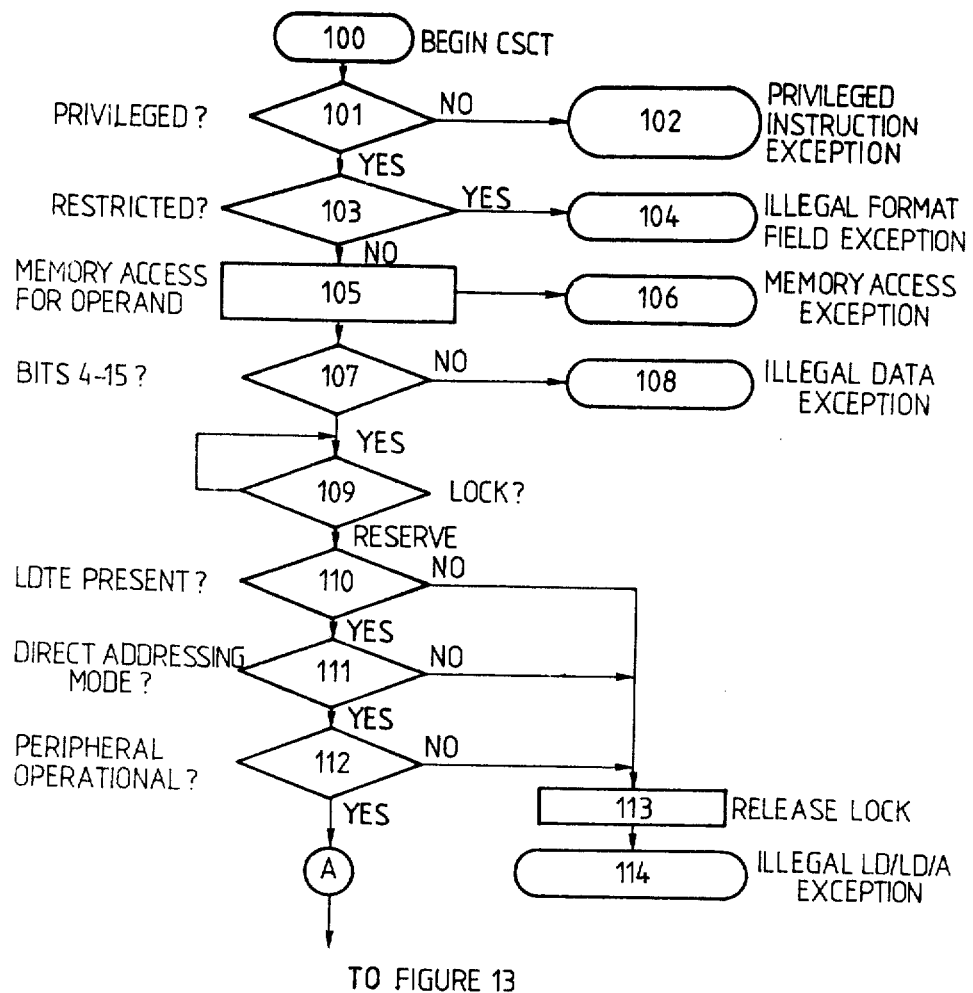
FIGS. 12 and 13 represent the flow chart for execution of a CSCT instruction.
Figure 13:
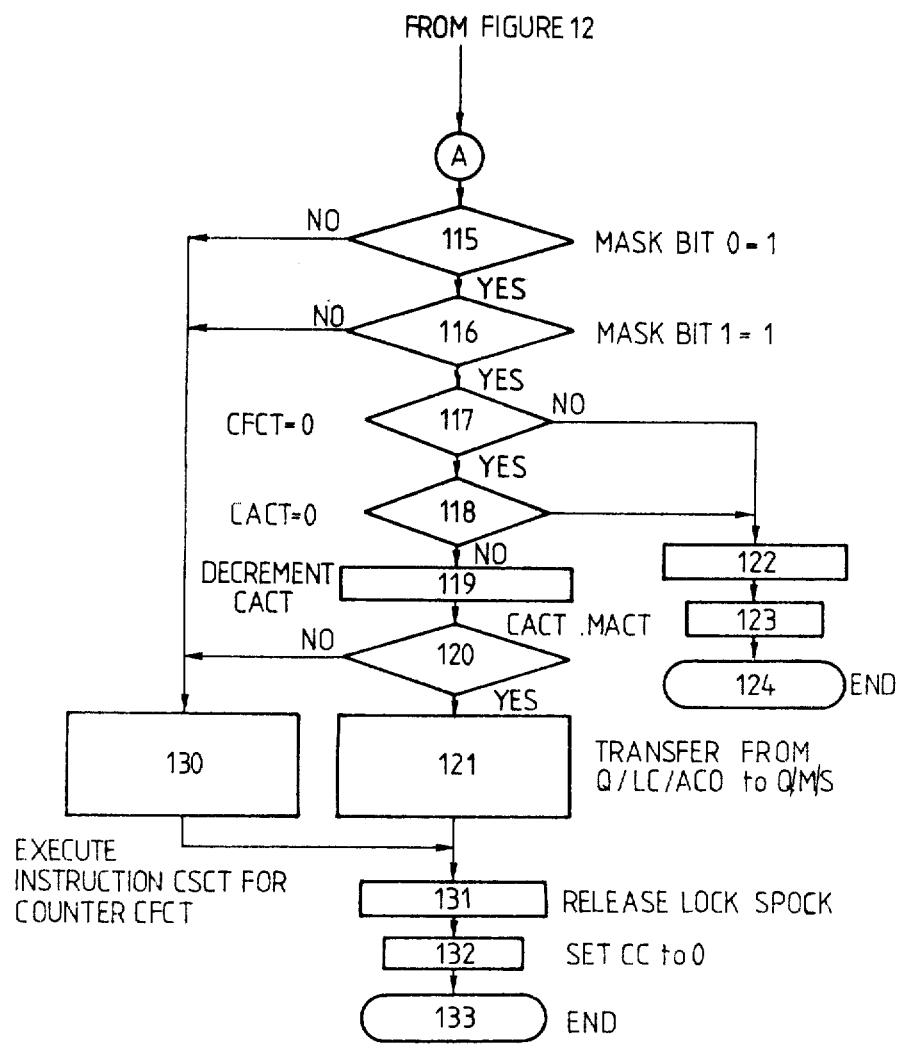

FIGS. 12 and 13 represent the flow chart of operations or instructions for execution of a CSCT instruction by the firmware.

Step 100 is the beginning of the execution of the instruction CSCT.

At Step 101, the firmware which has been chosen by the execution of the CSCT instruction verifies that this instruction indeed belongs to a "privileged" process. In effect the instruction CSCT is reserved for the operating system and cannot be used by the itilizer logic.

If the result of this examination is negative, that is to say that the instruction has been used by an ordinary processor, there is, at Step 102, release of an incident message of violation of privilege (Privileged Instruction Exception).

If the result of the examination in Step 101 is affirmative, this means that the privilege clauses are satisfied and execution continues at Step 103 where the firmware examines if the channel program concerned by this instruction uses the restricted address mode or the normal addressing mode.

If the result of the examination in Step 103 indicates that the addressing mode is restricted there is at Step 104, emission of an incident message for incorrect instruction format (Illegal Format Field Exception). In effect, the instruction CSCT concerns are peripheral device state table LDT. This table only exists for the normal addressing mode and any attempt to utilize this CSCT instruction in restricted mode is bound to fail.

If the result of the examination at Step 103 indicates that the addressing mode is the normal mode, the execution continues at Step 105 where the firmware accesses memory at the address AS for the operand associated with the CSCT instruction.

If in the course of this memory access there is violation of the memory access protection, at Step 106 an access violation message is emitted to the memory (memory access exception).

If this memory access respects the rules for access, the execution proceeds at Step 107 where the firmware verifies that bits 4 to 15 of the operand are indeed at zero. This verification is a verification of conformity. If at least one of the bits 4 to 15 is not zero, at Step 108 a message of non-conformity of configuration (Illegal data exception) is emitted.

If at Step 107 all the bits 4 to 15 of the operand are zero, the execution continues at Step 109 where the firmware takes protection measures to guarantee the synchronization of the operations which will follow. In effect in a multi-processor system, it is indispensable that the access to the system tables be arbitrated when it is a question of making modifications to the tables. If several processors can modify the tables concurrently, complete confusion can occur as a result. To remedy this disadvantage, the invention in its preferred embodiment utilizes a synchronization means which enables one processor and only one processor to access the system tables and semaphores at the same time to modify them. This synchronization means comprises an access lock SPLK of (Semaphore and Process Lock). This lock is the object of a commonly-assigned patent application.

The processors of the data processing system are anonymous, that is to say they have equal rights to access the tables. They are only restricted to the single previous clause for access to the tables for modifications that the lock SPLK is open. As a result, when a processor wishes, on demand by the firmware, to access the tables of the system to modify them, it must first of all ensure that the lock SPLK is open and therefore authorizes access for alteration of the tables and then, before proceeding to modification, switches the lock SPLK to prevent another processor from entering into competition with it to also make modifications to the tables. As will be seen further on, once the modifications to the tables are effected, the firmware will release access to the tables by opening the lock SPLK and enabling other processors to present their application for accessing the tables for the purpose of modification.

At Step 109 the firmware effects the operations described above. First of all the firmware verifies the state of the lock SPLK. If the lock is closed, the firmware waits in a "closed" loop until it opens.

If the lock is open, it locks it to reserve utilization of access to the tables, and execution continues at Step 110 where the firmware verifies if the entry addressed indeed exists in the peripheral device state table LDT. If the entry LDTE to be modified is not present, the lock SPLK is realeased at Step 113 and then, at Step 114, a peripheral device addressing incident message (Illegal LD/LD/A Exception) is emitted.

If at Step 110 the selected entry LDTE indeed exists, execution of the instruction CSCT continues at Step 111 where the firmware verifies that the direct addressing mode of the peripheral device LD# is authorized.

In effect the firmware in the normal mode, i.e. having a table LDT, can function according to two addressing modes: channel or restricted mode addressing mode, and peripheral device direct addressing mode or normal mode. In the addressing mode by channel, although the state table LDT exists, it is not used by the firmware which does not know about it and which, as a result, cannot execute the instructions affecting this table. In the mode for direct addressing of the peripheral device, the firmware is capable of executing instructions affecting the table LDT as well as utilizing this table.

If the decision at Step 111 has a negative result, that is to say the firmware is in channel addressing mode, the lock SPLK is freed at Step 113 and sends a peripheral device addressing incident message at Step 114.

If, on the other hand, the decision at Step 111 is positive, i.e. the mode of direct addressing of the peripheral device is utilized, execution continues at Step 112 where the firmware verifies that the peripheral device concerned is in an operational state.

If the peripheral device is not operational, the decision at Step 112 is negative and the firmware executes the operations at Steps 113 and 114 described above.

If a Step 112 it is determined that the peripheral device is operational, the execution continues as is represented in FIG. 13, Step 115. Here it is necessary to refer to FIG. 11 where the operand associated with the instruction CSCT is shown.

In this operand is a MASK comprising bits 0, 1, 2 and 3. Bits 0 and 1 concern the counter CACT, and the bits 2 and 3 relate to another counter designated CFCT (Current Freeze Count). If bits 0 and 1 of the MASK are "1", the instruction CSCT relates to the counter CACT. If bits 2 and 3 of the MASK are "1" instruction CSCT relates to the counter CFCT.

The state of the counter CFCT conditions the availability of the peripheral device concerned by the entry LDE. If the contents of the counter CFCT are nil, the peripheral is available. On the other hand, if the contents of the counter CFCT are non-zero, the peripheral device LD is set, that is to say no channel program can be made active for execution on this peripheral. This counter CFCT is utilized, for example, by a process which is waiting on a semaphore conditioned by this peripheral device.

This process, by incrementing by one unit the contents of the counter CFCT prevents modification of the entry LDE concerning the peripheral device.

At Step 115 the firmware verifies if the bit 0 of the MASK is at "1". If this bit is nil, this means that the CSCT instruction does not relate to the counter CACT; in this case, the instruction is carried out at Step 130 where the instruction processing for the counter CFCT is carried out.

If at Step 115 the bit 0 of the MASK is equal to "1", execution of the instruction CSCT continues where the firmware verifies if the bit 1 of the MASK is equal to "1".

If at Step 115 bit 1, of the MASK is equal to zero execution continues at Step 130, where the instruction CSCT for the counter CFCT is executed.

If at Step 116 the bit 1 of the MASK is equal to one, this indicates that the instruction CFCT relates to the counter CACT and execution continues at Step 117 where the firmware verifies that the contents of the counter CFCT are indeed equal to zero.

If a Step 117 the contents of the counter CFCT are different from zero, this means that the state of the peripheral is set and that, as a result, it is not possible to alter the entry LDE. Under these conditions execution continues at Step 122 where the firmware releases the lock SPLK. Then, at Step 123, the firmware sets the Code Condition CC to the value "1", which means that the instruction was unable to be completed since the contents of the counter CACT could not be altered since the development of the instruction is terminated at Step 124.

If at decision Step 117 the content of the counter CFCT is nil, this means that the entry LDE can be modified, since the state of the peripheral is not set. Execution continues at Step 118 where the firmware verifies that the contents of the counter CACT is nil. If these contents are nil, the instruction CSCT cannot be executed, since this instruction effects the decrementing by one unit of the contents of the counter CACT. Under this condition, execution of the instruction CSCT continues at Step 122 where the lock SPLK is released, then at Step 123 where the Code Condition CC is set to "1" and at Step 124 the development of the instruction is terminated.

If at Step 118 the counter CACT is not at zero, execution continues at Step 119 where the counter CACT is decremented by one unti.

Once this decrementing operation at Step 119 is completed, execution continues at Step 120 where the firmware verifies if this new content of the counter CACT is not less than the limit MACT. If the content CACT is not less than lkimit MACT, the part of execution of the instruction CSCT concerning the counter CACT is terminated and execution continues at Step 130 where the instruction CSCT for the counter CACT is executed.

If at Step 121 the contents of the counter CACT are less than the limit MACT, the firmware at Step 121 executes the arrangements necessary for utilization of the place which has become available by demanding transfer of an event waiting in the queue Q/LC/ACO to the queue Q/M/S.

Once this transfer demand has been executed, execution of the instruction is carried out at Step 131 where the firmware releases the lock SPL, then at Step 132 where the firmware positions the code condition CC to "0" which means that the instruction CSCT has developed favorably and that the counter CACT has been modified. At Step 133 execution of the instruction CSCT is terminated and the firmware is released to pass to another instruction.

FIG. 14 represents an instruction LLPA, this instruction comprises two parts: the instruction itself and a buffer memory zone associated with the instruction.

The instruction LLPA has a length of one word of 32 bits. The bits 0 to 7 contain the operation code OP, bits 8 to 11 contain additional bits to the instruction code and octets 12 to 31 contain an address syllable AS which is a pointer to the origin of the buffer memory zone.

The buffer memory zone associated with the instruction LLPA is composed of eight words of four octets each. In FIG. 14 only the octets directly concerning the present invention have been represented. The address of the octet or origin of the buffer memory zone, that is to say OCTET 0 of the WORD 0 is that given by the address syllable AS. The OCTETS 0 and 1 of the WORD 0 of the buffer memory zone must obligatorily be nil; they are designated by MBZ (Must Be Zero). On development of the instruction the firmware ensures the existence of this zone. OCTETS 2 and 3 of the WORD 0 contain the address of the peripheral device LD#, this address being designated in FIG. 14 by LDN (Logical Device Number). WORDS 0 to 3 of the buffer memory zone contain parameters for execution of instruction LLPA, while WORDS 4 to 7 of the buffer memory zone cntain parameters for conversion into WORDS 7 to 10 of the entry LDE of the table LDT corresponding to the peripheral device address LD#. The contents of WORD 4 of the buffer memory zone are converted to WORD 7 of the entry LDE, the contents of the WORD 5 of the memory zone are converted into WORD 8 of entry LDE, and so on, WORD 6 of the memory zone into WORD 9 of the entry LDE and WORD 7 of the memory zone to WORD 10 of the entry LDE. In FIG. 14, only the parameter MACT (Maximum Attention Count) which concerns the present invention is represented in OCTET 1 of WORD 5 where it is found. When the firmware wishes to modify the limit MACT, it loads the new limit MACT into the OCTET 1 of the WORD 5 of the memory zone associated with the instruction LLPA. In the course of execution of the instruction LLPA, the new limit MACT in loaded in place of the preceding limit MACT.

Figure 15:
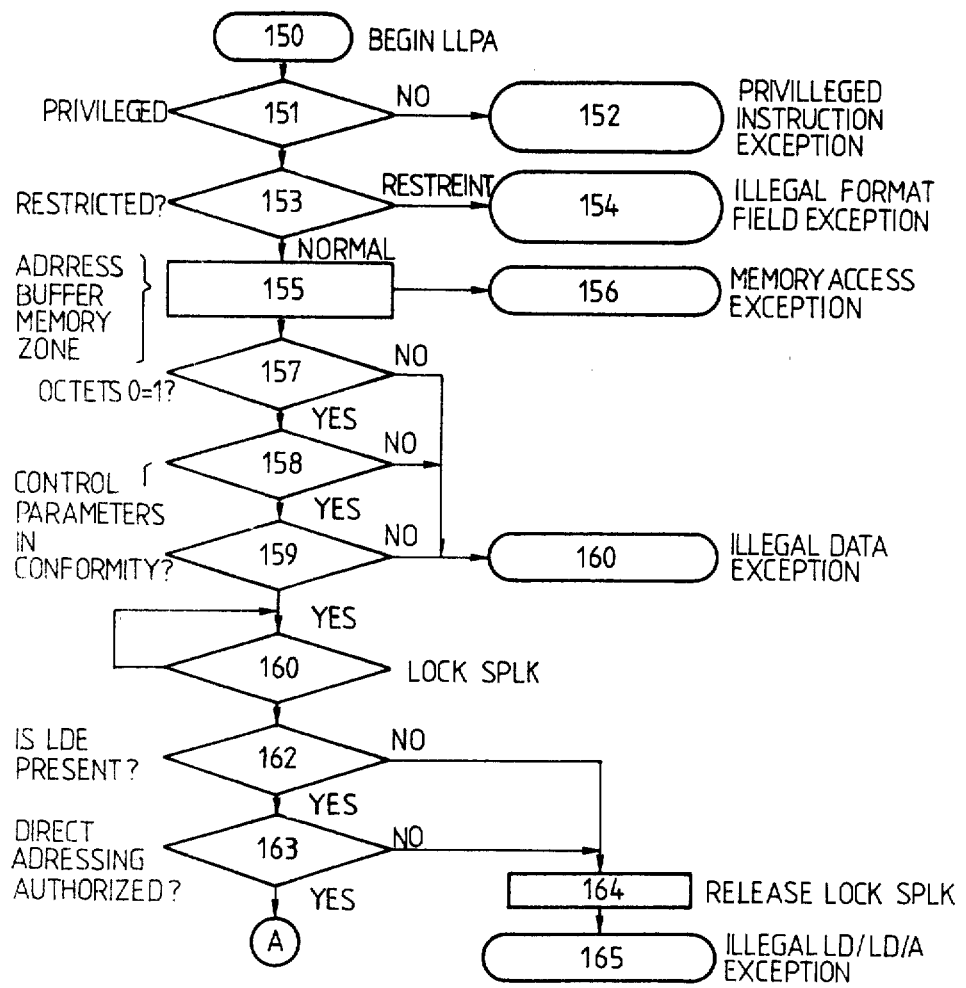
FIGS. 15 and 16 represent the flow chart for execution of an instruction LLPA.
Figure 16:
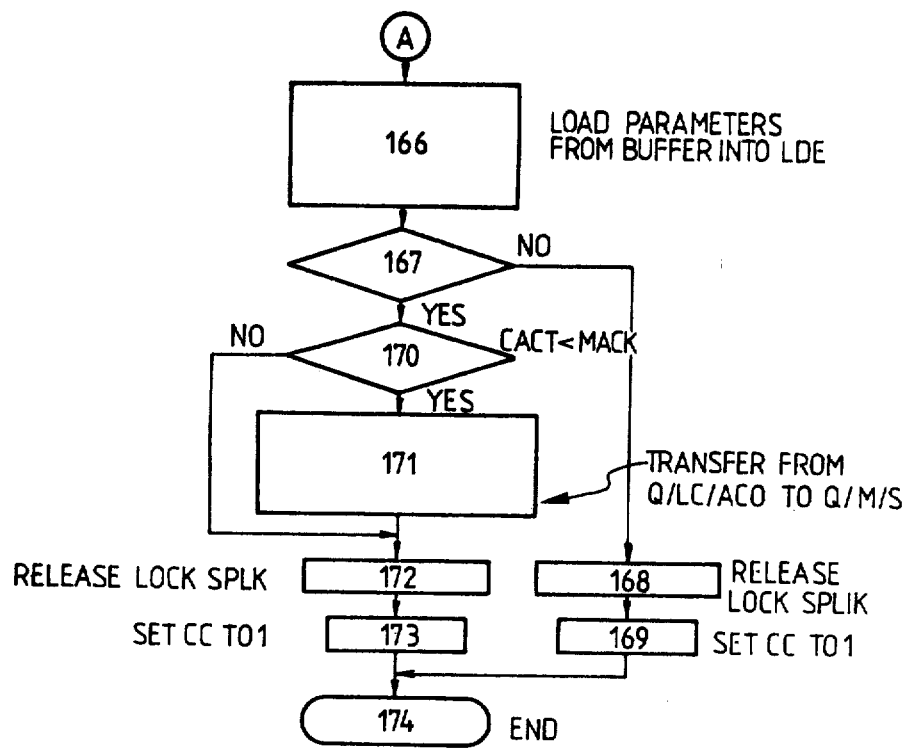

FIGS. 15 and 16 represent the flow chart for execution of the instruction LLPA by the firmware.

Execution of the instruction LLPA begins at Step 150, the firmware being immobilized to execute this instruction.

At Step 151, the firmware verifies that this instruction has indeed been part of an privileged process.

If the result of this verification at Step 141 is negative, that is to say the process is not privileged, an incident message for violation of privilege (Privileged Instruction Exception) is emitted at Step 152.

On the other hand, if the result of the verification at Step 151 is affirmative, the instruction at Step 153 is executed, where the firmware examines the addressing mode utilized by the channel program concerned: the restricted addressing mode or the normal addressing mode.

If at Step 153 it is found that the addressing mode utilized is the restricted mode then at Step 154 an incident message for uncorrected instruction format (Illegal Format Field Exception) is emitted. As has been said before, in this addressing mode the peripheral state table LDT does not exist and, as a result, the instruction LLPA cannot be executed.

If at Step 153 it is found that the addressing mode utilized is the normal mode, execution of the invention LLPA continues at Step 155, where the firmware accesses the memory for the contents of the buffer memory zone associated with the instruction LLPA. It will be recalled that this buffer zone comprises eight words of six octets and that the last four words of this zone are transferred to the entry LDE designated in the WORD 0 of the buffer memory zone. If, in the course of this memory access, there is a violation of the rights of access to the memory, an incident message for memory access violation (Memory Access Exception) is emitted at Step 156.

If the memory access at Step 155 is effected in conformity with the rules for access, execution continues at Step 157 where the firmware verifies that OCTETS 0 and 1 of the WORD 0 of the memory zone are indeed effectively nil.

If the response at Step 157 is negative, that is to say that all the bits comprising these octets are not all nil, the firmware emits a message for incidence of non-conformity of configuration (Illegal Data Exception) at Step 160.

If at Step 157 the response is affirmative, that is to say all the bits composing these octets are nil, execution continues at Steps 158 and 159 where the firmware verifies the conformity of certain control parameters with the buffer memory zone. If these parameters are not in conformity, a message for non-conformity of configuration is emitted at Step 160.

If the control parameters are in conformity, execution continues at Step 161 where the firmware tests the lock SPLK to learn if it is open. If this lock SPLK is closed, the firmware goes into a wait loop until the lock SPLK is opened. Opening of the lock SPLK signifies that access to the tables and semaphores by the firmware is possible. The firmware therefore accesses the tables and locks the access to the tables to prevent any other processor from entering into competition with the processor which it has selected for execution of the instruction LLPA.

Once the lock SPLK is closed, the firmware ensures at Step 162 that the entry LDE concerned by the instruction LLPA indeed exists.

If a Step 162 the entry LDE does not exist in table LDT, the firmware frees the lock SPLK at Step 164 and then emits a peripheral device addressing incident message (Illegal LD/LD/A Exception) at Step 165.

If at Step 162 the entry LDE indeed exists the firmware continues to Step 163 where it verifies that the peripheral device LD# direct addressing mode is authorized.

If at Step 163 this addressing is not authorized, the firmware at Step 164 releases the lock SPLK and then emits a peripheral device incident message at Step 165.

If at Step 163 direct addressing is authorized, the firmware continues execution of the instruction in FIG. 16 at Step 16 by loading the parameters contained in the buffer memory zone into the entry LDE. In particular, the new limit MACT is loaded into the OCTET 1 of WORD S of the entry LDE corresponding to the peripheral device designated by its address LDN in the OCTETS 2 and 3 of WORD 0 of the buffer memory zone.

Once this loading is effected, the firmware verifies at Step 167 that the peripheral device in question is operational, that is to say that for one reason or another it has not been put out of service.

If at Step 167 this peripheral device is out of service, the firmware at step 168 releases the lock SPLK and, at Step 169, sets the code condition CC to "1" to indicate that the instruction has indeed been carried out, but that the peripheral device has not been found operational. Finally the firmware terminates the execution of the instruction LLPA at Step 174.

If at Step 167 the peripheral device is operational the firmware verifies at Step 170 if, as a result of the new limit MACT, the contents of the counter CACT have not become less than the new limit MACT.

If at Step 170 the contents of the counter CACT are not less than the limit MACT, execution continues at Step 172 where the firmware releases the lock SPLK. Execution continues at Step 173 where the firmware sets the code condition CC to "1", which means that execution of the instruction is terminated and that the peripheral device has been found operational. Finally the firmware is released at Step 174 since the execution of the instruction LLPA is terminated.

If at Step 170 the contents of the counter CACT becomes less than the limit MACT, execution continues at Step 171 where the firmware demands withdrawal of events waiting on the queue Q/LC/ACO if ther are any. In effect, with the fact that the counter CACT no longer passes the limit MACT, it is possible to transfer messages waiting on the queue Q/LC/ACO towards the message queue towards the logic Q/M/S.

When this transfer is finished, the firmware releases the lock SPLK at Step 172, then the firmware sets the code condition CC to zero at Step 173, signifying by this that the instruction LLPA is ended and that the peripheral device LD has been found to be operational. At Step 174 the firmware terminates execution of the instruction LLPA and is available to execute another instruction.

Of course the invention is in no way limited to the particular embodiment described and shown and comprises all the technical equivalents of the means described as well as their combinations if the latter are effected in the spirit of the invention and put into operation within the scope of the claims which follow.

What is claimed is:

1. A method for managing asynchronous messages emitted by peripheral devices in a data processing system of the type including a central processing system, a plurality of peripheral devices, and a microprogrammed input-output controller for controlling data transfer between the peripheral devices and the central processing system, said method comprising the steps of: signalling to the input-output controller each asynchronous message emitted by a peripheral device; forming in the input-output controller an event message intended for informing the central processing system of the asynchronous message; and accessing a transmitted events counter assigned to the particular peripheral device and comparing the content of this transmitted events counter with the content of a boundary register assigned to the particular peripheral device and containing a limit value; and, if the content of the accessed transmitted events counter is less than the content of the assigned boundary register, then placing the event message in a primary waiting queue where event messages wait for action by the central processing system, and incrementing by one the content of the accessed transmitted events counter; or, if the content of the accessed transmitted events counter is equal to or greater than the content of the assigned boundary register, then placing the event message in a secondary waiting queue where the event message remains so long as the content of the accessed transmitted events counter is equal to or greater than the content of the assigned boundary register.

2. A method in accordance with claim 1, which further comprises the step of modifying the content of the transmitted events counter assigned to a particular peripheral device apart from an asynchronous message emitted by a peripheral device.

3. A method in accordance with claim 2, which further comprises, following the step of modifying the content of the transmitted events counter assigned to a particular peripheral device, if the content of the transmitted events counter is then less than the limit value in the boundary register, withdrawing from the secondary waiting queue and placing in the primary waiting queue as many event messages as are necessary such that, by increasing by one the content of the accessed transmitted events counter upon each placing of a new event message into the primary queue, the content of the accessed transmitted events counter reaches the limit value contained in the assigned boundary register, or until there are not more event messages waiting in the primary waiting queue.

4. A method in accordance with claim 1, which further comprises the step of modifying the content of the boundary register assigned to a particular peripheral so as to increase the limit value in the event of an overflow situation applying to the particular peripheral device.

5. A method in accordance with claim 4, which further comprises the step of modifying the content of the transmitted events counter assigned to a particular peripheral device apart from an asynchronous message emitted by a peripheral device.

6. A method in accordance with claim 5, which further comprises, following the step of modifying the content of the transmitted events counter assigned to a particular peripheral device, if the content of the transmitted events counter is then less than the limit value in the boundary register, withdrawing from the secondary waiting queue and placing in the primary waiting queue as many event messages as are necessary such that, by increasing by one the content of the accessed transmitted events counter upon each placing of a new event message into the primary queue, the content of the accessed transmitted events counter reaches the limit value contained in the assigned boundary register, or until there are not more event messages waiting in the primary waiting queue.

7. A method in accordance with claim 4, which further comprises, following the step of modifying the content of the boundary register assigned to a particular peripheral device, if the content of the transmitted events counter is then less than the limit value in the boundary register, withdrawing from the secondary waiting queue and placing in the primary waiting queue as many event messages as are necessary such that, by increasing by one the content of the accessed transmitted events counter upon each placing of a new event message into the primary queue, the content of the accessed transmitted events counter reaches the limit value contained in the assigned boundary register, or until there are no more event messages waiting in the primary waiting queue.

8. A method in accordance with claim 7, which further comprises the step of modifying the content of the transmitted events counter assigned to a particular peripheral device apart from an asynchronous message emitted by a peripheral device.

9. A method in accordance with claim 8, which further comprises, following the step of modifying the content of the transmitted events counter assigned to a particular peripheral device, if the content of the transmitted events counter is then less than the limit value in the boundary register, withdrawing from the secondary waiting queue and placing in the primary waiting queue as many event messages as are necessary such that, by increasing by one the content of the accessed transmitted events counter upon each placing of a new event message into the primary queue, the content of the accessed transmitted events counter reaches the limit value contained in the assigned boundary register, or until there are no more event messages waiting in the primary waiting queue.

10. In a data processing system of the type including a central processing system and a plurality of peripheral devices emitting asynchronous messages, an input-output controller including microprograms for controlling data transfer between the peripheral devices and the central processing system, said input-output controller comprising: a transmitted events counter assigned to each peripheral device; a boundary register assigned to each peripheral device for storing a limit value; means for receiving each asynchronous message emitted by a peripheral device; means for forming an event message intended for forming the central processing system of the asynchronous message; and means for accessing the transmitted events counter assigned to the particular peripheral device and comparing the content of this transmitted events counter with the content of the boundary register assigned to the particular peripheral device, and, if the content of the accessed transmitted events counter is less than the content of the assigned boundary register, then placing the event message in a primary waiting queue where event messages wait for action by the central processing system, and incrementing by one the content of the accessed transmitted events counter, or, if the content of the accessed transmitted events counter is equal to or greater than the content of the assigned boundary register, then placing the event message in a secondary waiting queue where the event message remains so long as the content of the accessed transmitted events counter is equal to or greater than the content of the assigned boundary register.

11. An input-output controller in accordance with claim 10, which further comprises means for modifying the content of the transmitted events counter assigned to a particular peripheral device apart from an asynchronous message emitted by a peripheral device.

12. An input-output controller in accordance with claim 11, which further comprises means for withdrawing from the secondary waiting queue and placing in the primary waiting queue as many event messages as are necessary such that, by increasing by one the content of the accessed transmitted events counter upon each placing of a new event message into the primary queue, the content of the accessed transmitted events counter reaches the limit value contained in the assigned boundary register, or until there are no more event messages waiting in the primary waiting queue, if, following the step of modifying the content of the transmitted events counter assigned to a particular peripheral device, the content of the transmitted events counter is then less than the limit value in the boundary register.

13. An input-output controller in accordance with claim 10, wherein the content of the boundary register assigned to a particular peripheral is capable of being modified so as to increase the limit value in the event of an overflow situation applying to the particular peripheral device.

14. A method in accordance with claim 13, which further comprises means for modifying the content of the transmitted events counter assigned to a particular peripheral device apart from an asynchronous message emitted by a peripheral device.

15. An input-output controller in accordance with claim 14, which further comprises means for withdrawing from the secondary waiting queue and placing in the primary waiting queue as many event messages as are necessary such that, by increasing by one the content of the accessed transmitted events counter upon each placing of a new event message into the primary queue, the content of the accessed transmitted events counter reaches the limit value contained in the assigned boundary register, or until there are no more event messages waiting in the primary waiting queue, if, following the step of modifying the content of the transmitted events counter assigned to a particular peripheral device, the content of the transmitted events counter is then less than the limit value in the boundary register.

16. An input-output controller in accordance with claim 13, which further comprises means for withdrawing from the secondary waiting queue and placing in the primary waiting queue as many event messages as are necessary such that, by increasing by one the content of the accessed transmitted events counter upon each placing of a new event message into the primary queue, the content of the accessed transmitted events counter reaches the limit value contained in the assigned boundary register, or until there are no more event messages waiting in the primary waiting queue, if, following the step of modifying the content of the boundary register assigned to a particular peripheral device the content of the transmitted events counter is then less than the limit value in the boundary register.

17. A method in accordance with claim 16, which further comprises means for modifying the content of the transmitted events counter assigned to a particular peripheral device apart from an asynchronous message emitted by a peripheral device.

18. An input-output controller in accordance with claim 17, which further comprises means for withdrawing from the secondary waiting queue and placing in the primary waiting queue as many event messages as are necessary such that, by increasing by one the content of the accessed transmitted events counter upon each placing of a new event message into the primary queue, the content of the accessed transmitted events counter reaches the limit value contained in the assigned boundary register, or until there are no more event messages waiting in the primary waiting queue, if, following the step of modifying the content of the transmitted events counter assigned to a particular peripheral device, the content of the transmitted events counter is then less than the limit value in the boundary register.

* * * * *

UNITED STATES PATENT AND TRADEMARK OFFICE
CERTIFICATE OF CORRECTION

PATENT NO. : 4,393,470
DATED : July 12, 1983
INVENTOR(S) : Pierre V. L. Miard

It is certified that error appears in the above—identified patent and that said Letters Patent are hereby corrected as shown below:

In Claim 3, column 21, line 26, change the word "not"
to --no--;

In Claim 10, column 22, line 32, change the word "forming"
to --informing--.

Signed and Sealed this

First Day of November 1983

[SEAL]

Attest:

Attesting Officer

GERALD J. MOSSINGHOFF

Commissioner of Patents and Trademarks